United States Patent
Dice et al.

(10) Patent No.: US 8,689,237 B2
(45) Date of Patent: Apr. 1, 2014

(54) MULTI-LANE CONCURRENT BAG FOR FACILITATING INTER-THREAD COMMUNICATION

(75) Inventors: David Dice, Foxboro, MA (US); Oleksandr Otenko, Winnersh (GB)

(73) Assignee: Oracle International Corporation, Redwood City, CA (US)

( * ) Notice: Subject to any disclaimer, the term of this patent is extended or adjusted under 35 U.S.C. 154(b) by 112 days.

(21) Appl. No.: 13/241,015

(22) Filed: Sep. 22, 2011

(65) Prior Publication Data

US 2013/0081061 A1    Mar. 28, 2013

(51) Int. Cl.
*G06F 9/44* (2006.01)
*G06F 9/46* (2006.01)

(52) U.S. Cl.
USPC .......................................... 719/314; 718/103

(58) Field of Classification Search
None
See application file for complete search history.

(56) References Cited

U.S. PATENT DOCUMENTS

| | | | |
|---|---|---|---|
| 5,867,734 A | 2/1999 | Drews | |
| 6,212,543 B1 | 4/2001 | Futral | |
| 7,644,197 B1 | 1/2010 | Waldorf et al. | |
| 2003/0041185 A1 | 2/2003 | Creta et al. | |
| 2003/0065892 A1* | 4/2003 | Bonola | 711/147 |
| 2005/0246186 A1 | 11/2005 | Nikolov | |
| 2006/0123156 A1* | 6/2006 | Moir et al. | 710/33 |
| 2007/0074217 A1 | 3/2007 | Rakvic et al. | |
| 2007/0088792 A1* | 4/2007 | Piper et al. | 709/207 |
| 2007/0150586 A1 | 6/2007 | Kilian et al. | |
| 2008/0066066 A1* | 3/2008 | MacPherson | 718/100 |
| 2008/0276025 A1 | 11/2008 | Cherem et al. | |
| 2009/0249356 A1* | 10/2009 | He et al. | 719/314 |
| 2010/0211954 A1* | 8/2010 | Bauer et al. | 718/103 |
| 2010/0299508 A1 | 11/2010 | Luttrell | |
| 2012/0102501 A1* | 4/2012 | Waddington et al. | 718/105 |

OTHER PUBLICATIONS

Maged Michael and Michael Scott, "Simple, fast, and practical non-blocking and blocking concurrent queue algorithms,"Jan. 30, 2008, 3 pages downloaded at http://www.cs.rochester.edu/research/synchronization/pseudocode/queues.html.
Maged Michael and Michael Scott, Simple, fast, and practical non-blocking and blocking concurrent queue algorithms, ACM PODC 1996, 9 pages.
Y. Afek, G. Korland, and E. Yanovsky, "Quasi-linearizability: Relaxed consistency for improved concurrency," Tel-Aviv University, Aug. 2011, 45 pages.

(Continued)

*Primary Examiner* — Charles E Anya
*Assistant Examiner* — Abdou Seye
(74) *Attorney, Agent, or Firm* — Robert C. Kowert; Meyertons, Hood, Kivlin, Kowert & Goetzel, P.C.

(57) ABSTRACT

A method, system, and medium are disclosed for facilitating communication between multiple concurrent threads of execution using a multi-lane concurrent bag. The bag comprises a plurality of independently-accessible concurrent intermediaries (lanes) that are each configured to store data elements. The bag provides an insert function executable to insert a given data element into the bag by selecting one of the intermediaries and inserting the data element into the selected intermediary. The bag also provides a consume function executable to consume a data element from the bag by choosing one of the intermediaries and consuming (removing and returning) a data element stored in the chosen intermediary. The bag guarantees that execution of the consume function consumes a data element if the bag is non-empty and permits multiple threads to execute the insert or consume functions concurrently.

18 Claims, 4 Drawing Sheets

(56) References Cited

OTHER PUBLICATIONS

A. Gottlieb, B. D. Lubachevsky, and L. Rudolph, "Basic techniques for the efficient coordination of very large numbers of cooperating sequential processors," ACM, This report (minus sections 2.3, 8, and 9) appeared in the Apr. 1983 issue of TOPLAS, 37 pages.

D. Hendler, I. Incze, N. Shavit, and M. Tzafrir, "Flat combining and the synchronization-parallelism tradeoff," ACM Jun. 13-15, 2010, 10 pages.

D. Hendler, I. Incze, N. Shavit, and M. Tzafrir, Scalable flat-combining based synchronous queues, In Distributed Computing. 2010, 15 pages.

J. M. Mellor-Crummey, Concurrent queues: Practical fetch-and-φ algorithms, 1987, University of Rochester Computer Science Technical Report # 229, 31 pages.

W. N. Scherer, III, D. Lea, and M. L. Scott, "Scalable synchronous queues," Communications of the ACM, vol. 52, No. 5, May 2009, 9 pages.

Y. Afek, G. Korland, M. Natanzon, and N. Shavit, "Scalable producer-consumer pools based on elimination-diffraction trees," P.D'Ambra, M., Guarracino and D. Talia (Eds.): Euro-Par 2010, Part II, LNCS 6272, pp. 151-162, 2010 Springer-Verlag Berlin Heidelberg.

U.S. Appl. No. 13/241,003, filed Sep. 22, 2011, Oracle America, Inc., all pages.

* cited by examiner

MULTI-LANE CONCURRENT BAG FOR FACILITATING INTER-THREAD COMMUNICATION

BACKGROUND

A relationship that often arises between components of a software system is the producer/consumer pattern. In such a pattern, a group of one or more producers need to communicate messages or other data to a group of one or more consumers. For convenience, the consumed items are referred to herein generally as "messages," but may include objects, data structures, strings, and/or any other data that a producer can communicate to a consumer.

Communication between producers and consumers is sometimes implemented using an intermediary data structure. The intermediary might expose an insert( ) function that producers can invoke to insert new messages and a consume( ) function that consumers can invoke to retrieve and remove an inserted message from the intermediary. Thus, the intermediary effectively decouples the production and consumption activities by enabling a producer to insert a message into the structure and a consumer to independently retrieve that message later. The intermediary guarantees that inserted items are not consumed more than once.

Different types of intermediaries can make different ordering guarantees. For example, a FIFO queue implementation guarantees that items are consumed in the same order as they are inserted. Different types of queues may make different ordering guarantees (e.g., a LIFO queue, priority queue, etc.). A bag is an intermediary that makes no ordering guarantee.

A blocking intermediary blocks a consumer that attempts to consume an item when the intermediary is empty. Thus, the intermediary may make one or more consumers wait if the intermediary is empty. When a producer finally does insert an item into the bag, the intermediary returns the item to one of the blocked consumers, thereby releasing that consumer.

A concurrent intermediary is a thread-safe intermediary, that is, one that maintains correctness, even if multiple producers and/or consumers are executing in parallel. For example, a concurrent bag guarantees that, when multiple consumers and producers attempt to access the bag concurrently, each inserted message is still never consumed more than once. Concurrent systems, in which different threads concurrently perform the production and consumption activities, require concurrent intermediaries.

To make an intermediary concurrent (i.e., thread-safe), previous designs would use a mutual-exclusion lock to control concurrent access to the intermediary. In such implementations, a producer or consumer must first obtain and hold an exclusive lock on the intermediary before performing the put or take operation.

It is often inefficient to control access to an intermediary using an exclusive lock. First, the lock creates a point of contention as the concurrent threads attempt to obtain it concurrently. Second, while a producer or consumer holds the lock, other threads cannot access the intermediary at all. Accordingly, there has been much interest in designing more efficient concurrent data structures.

SUMMARY

A method, system, and medium are disclosed for facilitating communication between multiple concurrent threads of execution using a multi-lane concurrent bag. The bag comprises a plurality of independently-accessible concurrent intermediaries (lanes) that are each configured to store data elements. The bag provides an insert function executable to insert a given data element into the bag by selecting one of the intermediaries and inserting the data element into the selected intermediary. The bag also provides a consume function executable to consume a data element from the bag by choosing one of the intermediaries and consuming (removing and returning) a data element stored in the chosen intermediary. The bag guarantees that execution of the consume function consumes a data element if the bag is non-empty and permits multiple threads to execute the insert or consume functions concurrently.

In some embodiments, the insert function and consume functions are configured to select successive intermediaries in the same predefined order. For example, the intermediaries may be ordered in an array or linked list, and successive executions the insert function may select successive intermediaries in the array or linked list. Successive executions of the consume function may similarly select successive intermediaries in the array or linked list.

To select successive intermediaries in the order, the bag may maintain an indication of the most recent intermediary chosen by the insert function and another indication of the most recent intermediary chosen by the consume function. The insert and consume functions may be configured to choose the next intermediary in the order by atomically getting and modifying the corresponding indication (i.e., insert or consume indication) according to the order. For example, the insert indication may be a global counter indicating the position of the previously chosen intermediary within an intermediary array and atomically modifying the indication may comprise incrementing the counter.

In various embodiments, the intermediaries may be implemented as concurrent queues, concurrent bags, or other types of collections. Intermediaries may be a blocking, such that a consume function invoked on an empty intermediary may block the invoking thread until another element is inserted. The bag may be used for various purposes, such as general inter-thread communication, to implement a resource pool, to implement an efficient semaphore, and/or for other uses.

Figure 1:
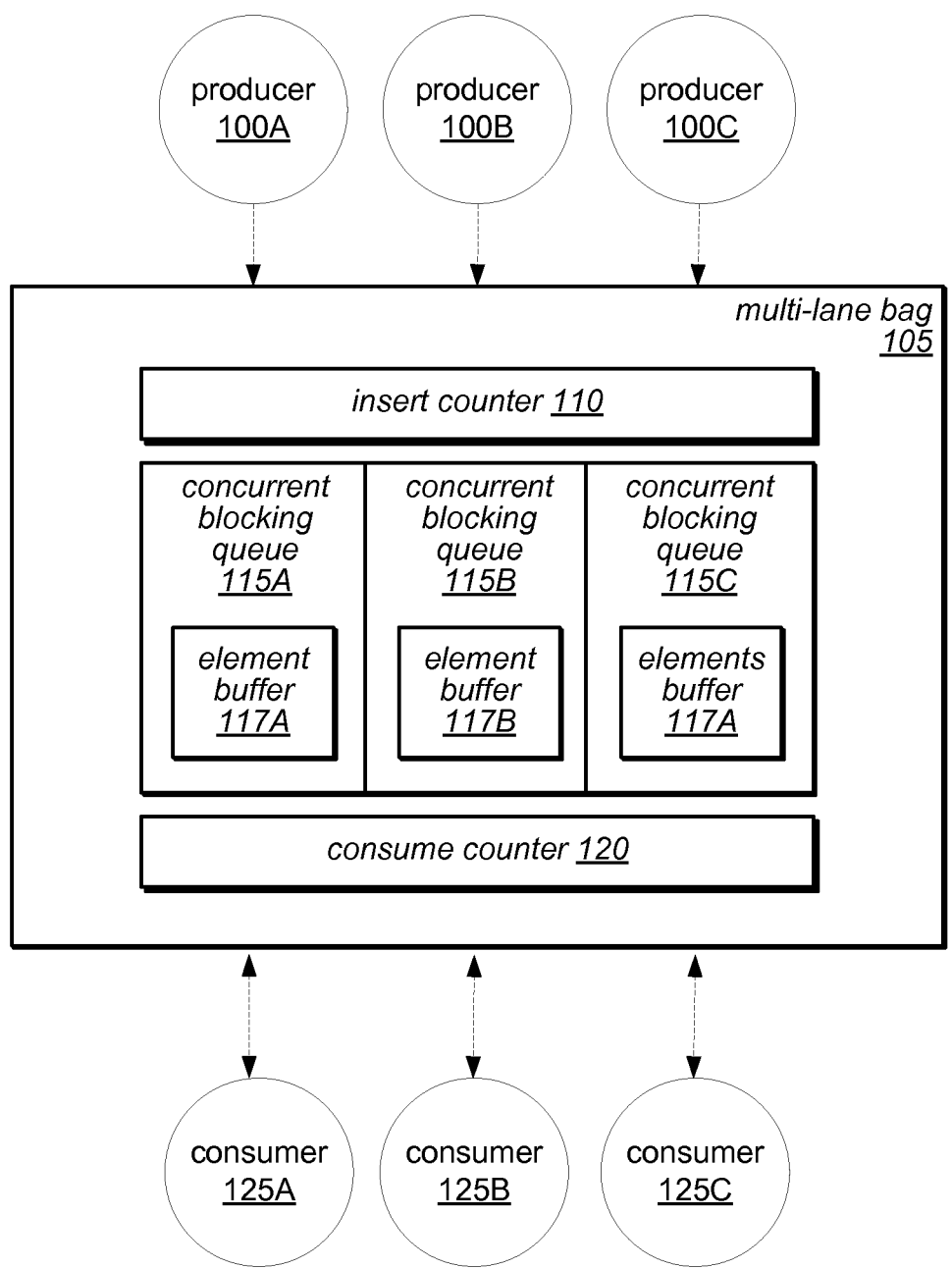
FIG. 1 is a block diagram illustrating the components of a multi-lane bag being used to coordinate communication between a group of producers and consumers, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may"

is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

A concurrent bag is an intermediary data structure usable by one or more concurrent producer threads to pass messages (and/or other data items) to one or more concurrent consumer threads in an unsynchronized manner. For example, producers may place messages into the concurrent bag using an insert( ) interface, and consumers may subsequently consume (i.e., read and remove) the messages asynchronously using a consume interface. In contrast to a queue, the bag does not make any guarantee regarding the order in which items will be consumed.

A concurrent bag enforces several correctness guarantees in the presence of multiple concurrent producers and/or consumers. First, the concurrent bag guarantees that no inserted item is consumed more than once. Second, the concurrent bag guarantees that if the bag is not empty, the next consume operation will return an item from the bag. For example, if there is a single item in the bag, the next consume operation will return that item rather than potentially block indefinitely.

Traditional concurrent bags may use exclusive locks to control concurrency and therefore may have poor scaling behavior as the number of producer and consumer threads grows. The poor scaling performance may be due to the high synchronization overhead of coordinating between the multiple threads.

According to various embodiments, a multi-lane concurrent blocking bag (hereinafter "multi-lane bag") provides a concurrent blocking intermediary that implements bag behavior and scales efficiently with the number of producers and consumers. The multi-lane bag includes multiple "lanes," with which producers and/or consumers may interact concurrently. Each lane may be implemented by a respective concurrent blocking intermediary, such as a traditional concurrent blocking queue or bag.

The multi-lane bag uses a concurrency-control mechanism to distribute producer and consumer accesses among the multiple lanes in a manner that maintains consistent bag behavior. For example, a multi-lane bag may manage access to the lanes using a set of atomic global counters. To insert an item into the bag, a producer may atomically increment a global insert counter, use the new value of that counter to select one of the lanes (e.g., calculate a lane index as insertCounter % numberOfLanes), and insert the item into the selected lane. Similarly, to consume an item from the bag, a consumer may atomically increment a global consume counter, use the new value of that counter to select one of the lanes (e.g., calculate a lane index as consumeCounter % numberOfLanes), and attempt to consume an item from the selected lane. If the selected lane is non-empty, the lane will return an item to the consumer, but if the lane is empty, it will block the consumer until a producer inserts an item into that lane. Because each lane is implemented by a respective blocking intermediary, multiple consumers may be concurrently blocked on the same lane. Because the multi-lane bag permits multiple consumers and producers to interact with it concurrently, it outperforms traditional implementations as the number of consumers and producers grow.

FIG. 1 is a block diagram illustrating the components of a multi-lane bag being used to coordinate communication between a group of producers and consumers, according to some embodiments. The multi-lane bag may be implemented as an in-memory data structure.

According to FIG. 1, producers 100A-100C communicate with consumers 125A-125C by placing elements into multi-lane bag 105, which consumers 125 may retrieve. The term "elements" is used herein to refer to any message, object, communication, or other data. It should be noted that bag 105 may have different uses, such as one-way inter-thread communication (i.e., producers 100 communicating with consumers 125), two-way inter-thread communication (i.e., threads act as both producers and consumers), resource pooling (e.g., bag 105 holds a finite number of objects, such as database connections, which threads take to use and replace when done), and/or other uses.

Multi-lane bag 105 includes three independently accessible lanes 115, each implemented by a respective concurrent blocking intermediary configured to hold inserted elements in buffers 117. In the illustrated embodiment, the three lanes are implemented using concurrent blocking queues 115A-115C, though in other embodiments, other types of concurrent blocking intermediaries (e.g., bag) may be used.

Each of queues 115 is separately accessible by producers 100 and consumers 125. Therefore, for example, producer 100A may store an element into queue 115A at the same time as producer 100B stores an element into blocking queue 115B or 115C. If multiple elements are inserted into the queue without being consumed by a consumer, the queue may buffer the elements in buffer 117. To implement a queue, element buffer 117 may order the elements.

As mentioned above, each lane is implemented by an intermediary that is both concurrent and blocking. Each of queues 115 is concurrent because it maintains correct behavior, even when multiple producers and/or consumers attempt to access the queue concurrently. In some embodiments, the queue may implement concurrency control using an exclusive lock that permits only the exclusive lock holder to access the queue. In other embodiments, a queue may permit concurrent access by at most one producer and one consumer. To implement such concurrency control, the queue may utilize one lock for producers and a separate lock for consumers.

In addition to being concurrent, each queue 115 is also blocking. That is, if a consumer 125 attempts to consume an element from an empty queue, the queue may block the consumer until an element is inserted into the queue. In some embodiments, the queue may block a producer that attempts to insert an element into a queue whose element buffer is full. In other embodiments, the queue may simply raise an error.

Multi-lane bag 105 includes insert counter 110 and consume counter 120, which it may use to coordinate access among the producers and consumers respectively. Each counter may be implemented as a respective numeric variable, which may be incremented atomically (e.g., AtomicLong).

To insert an element into the bag, a producer may atomically get and increment the insert counter 110. Thus, the producer obtains a unique identifier for the insert operation. The producer may then use the unique identifier to choose one of the lanes of the bag. For instance, the producer may calculate a lane index by calculating a modulo of the identifier and the number of lanes. The producer may then identify a target lane corresponding to the lane index. For instance, if the lanes are stored in an array, the target lane could be the on at the lane index of the array. The producer may then invoke an insert function of the target lane to insert the element. In some embodiments, if the lane's buffer is full, the lane blocks the producer until there is sufficient capacity in the buffer (e.g., after a consumer removes an element from the buffer).

To consume an inserted element, a consumer follows a similar process as the insert method, but uses the consume counter 120. The consumer may atomically get and increment the consume counter 120 and thus obtain a unique identifier for the consume operation. The consume may then use the unique identifier to choose one of the lanes of the bag from which it will consume the element. As before, the consumer may determine a target lane by calculating a lane index equal to the consume operation identifier modulo the number of lanes. The consumer may then invoke the consume function of the target lane to read and remove an element. In some embodiments, if the lane's buffer is empty, the lane blocks the consumer until there is an element in the buffer to return to the consumer. In some embodiments, multiple consumers may be blocked on a single lane.

Figure 2:
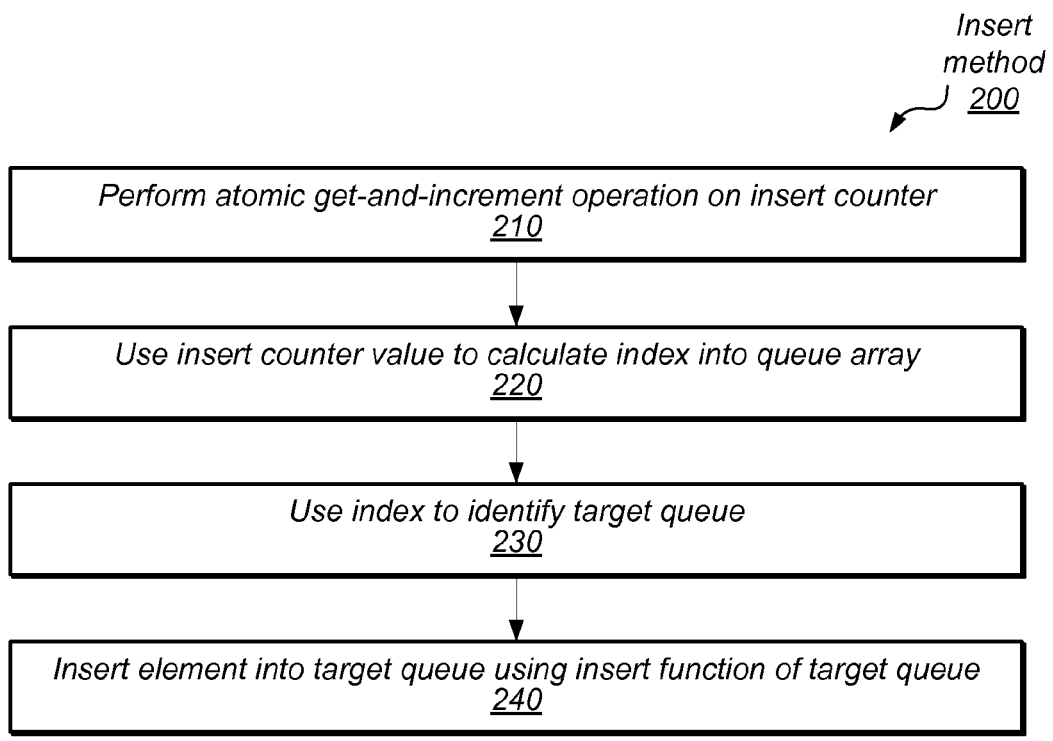
FIG. 2 is a flow diagram illustrating a method for inserting an element into a multi-lane bag, according to some embodiments.

FIG. 2 is a flow diagram illustrating a method for inserting an element into a multi-lane bag, according to some embodiments. Insert method 200 maybe executed by a producer thread, such as producer threads 100.

Method 200 begins when the producer thread performs an atomic get and read operation on the insert counter, as in 210. The insert counter may correspond to insert counter 110 in FIG. 1. Performing the atomic operation in 210 comprises performing two operations together as a single atomic operation: getting the value of the insert counter and incrementing it. Performing the two operations as a single atomic operation means that while the atomic operation executes, no other thread will execute (fully or partially) another atomic get-and-increment operation. In some embodiments, the atomic get-and-increment operation may return the pre-increment counter value, and in others, the operation may return the post-increment value.

In 220, the producer thread uses the counter to calculate an index into an array of queues (i.e., lanes). For example, in 220, the producer may modulo the insert counter value received in 210 by the number of lanes to calculate the index value. Step 220 assumes that the queues are arranged as an array. However, in various embodiments, arbitrary other schemes or arrangements may be used so that the result of 220 is a unique identifier corresponding to one of the lanes.

In 230, the producer determines a target queue to which the index value calculated in 220 corresponds. For example, the target queue may be the one pointed to by a slot of an index array that corresponds to the index.

In 240, the producer inserts the element into the target queue (determined in 230). Inserting the element into the target queue may comprise invoking an insert function of the target queue. If the target queue is full, the insert function may block the producer until sufficient space opens up.

Figure 3:
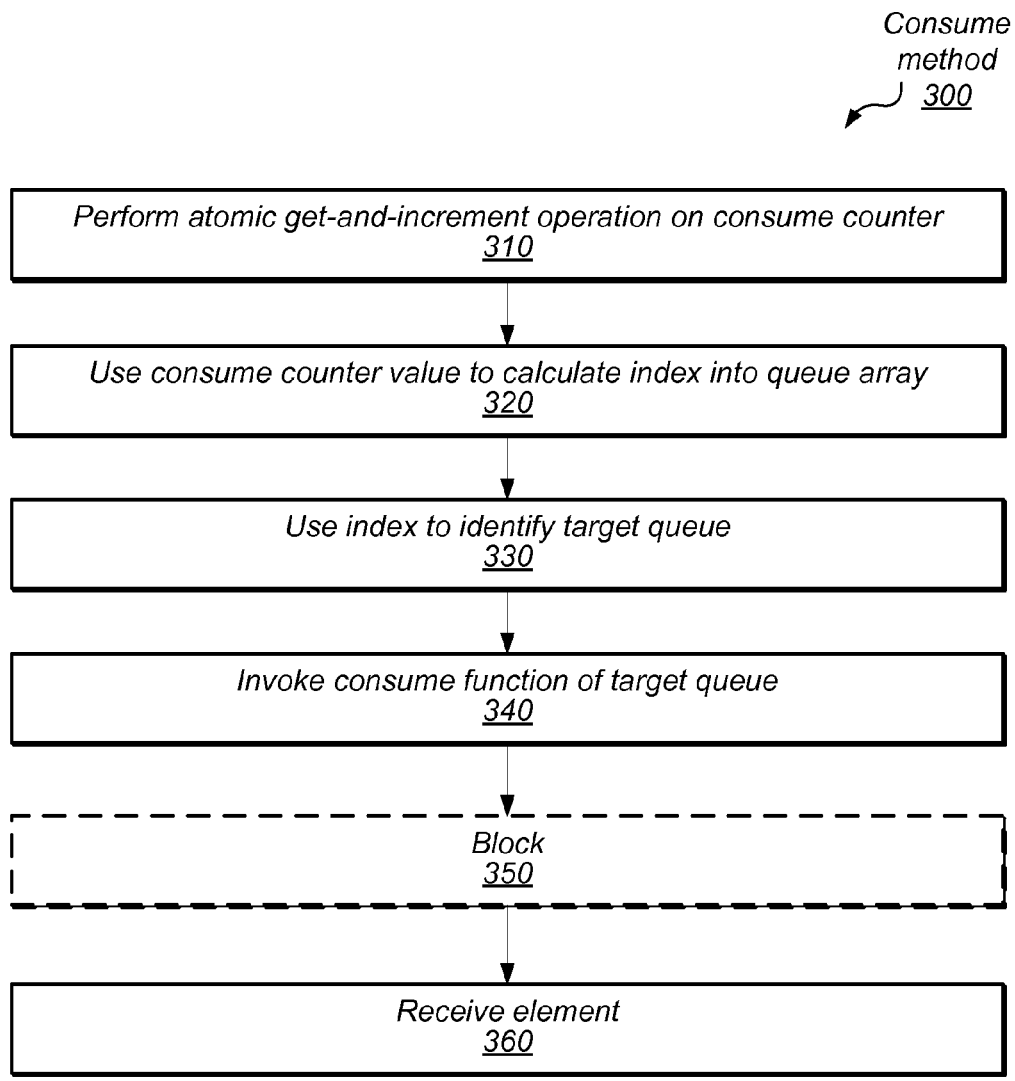
FIG. 3 is a flow diagram illustrating a method for consuming an element from the multi-lane bag, according to some embodiments.

FIG. 3 is a flow diagram illustrating a method for consuming an element from the multi-lane bag, according to some embodiments. Method 300 of FIG. 3 may be executed by a consumer thread, such as consumer threads 125 of FIG. 1.

Method 300 begins in 310, when the consumer performs an atomic get-and-increment operation on the consume counter. The atomic get-and-increment operation of 310 may be analogous to the atomic get-and-increment operation of step 210 in FIG. 2, but applied to the consume counter (e.g., consume counter 120 of FIG. 1).

In 320, the consumer uses the counter value gotten in 310 to calculate an index into the queue array. In some embodiments, the consumer may use a calculation analogous to that used by the producers in 220. For example, consumer may modulo the consume counter value received in 310 by the number of lanes to calculate the index value.

In 330, the consumer uses the index value to identify a target queue, also in a manner analogous to that used by the producers in 330. In 340, the consumer invokes the consume function of the target queue. If the queue is empty, the consume function may block the consumer for some period, as in 350. When the target queue has an element to return to the consumer, the consumer receives the element, as in 360.

A multi-lane bag, such as 105, may be implemented in various languages and/or technologies. As a reference implementation, consider the below Java-style code for implementing a multi-lane bag:

```
public static class MultiLane_Bag< T > {
    // Array of underlying blocking concurrent collections ...
    private final ArrayBlockingQueue<T> [ ] q;
// insertCounter and consumeCounter are insert and consume "cursors"
// that chase each other
    private final AtomicLong insertCounter = new AtomicLong( );
    private final AtomicLong consumeCounter = new AtomicLong( );
    public MultiLane_Bag( int numberOfLanes ) {
      q = (ArrayBlockingQueue<T >[ ])new ArrayBlockingQueue-
      [numberOfLanes];
      for (int i = 0; i < numberOfLanes; i++ ) {
        q[i] = new ArrayBlockingQueue<T >(1);
      }
    }
    public void insert( T v ) throws InterruptedException {
      long insertIdentifier = insertCounter.getAndIncrement( );
      q[(int)( insertIdentifier % q.length)].put(v) ;
    }
    public T consume( ) throws InterruptedException {
      long consumeIdentifier = consumeCounter.getAndIncrement( );
      T v = q[(int)( consumeIdentifier % q.length)].take( ) ;
      return v;
    }
}
```

In the embodiment above, the MultiLane_Bag class implements a multi-lane bag, such as 105 of FIG. 1. The MultiLane_Bag class includes a constructor that accepts an argument specifying the number of lanes in the bag. When invoked, the constructor creates an array of N concurrent blocking queues, where N is the number of lanes specified. Thus, the variable ArrayBlockingQueue[ ] holds the N lanes (e.g., corresponding to blocking queues 115 of FIG. 1). As mentioned above, in other embodiments, each slot of the array may hold a concurrent blocking bag or other concurrent blocking intermediary other than a queue.

The MultiLane_Bag class also includes two member variables insertCounter and consumeCounter corresponding to insert counter 110 and consume counter 120 respectively. The counters are implemented as instances of the AtomicLong class, which maintains a long numerical type and provides a method for atomically getting and incrementing that long (i.e., getAndIncrement( )). The long is sufficiently large that it will not overflow during the lifetime of the program. The getAndIncrement( ) method atomically performs the two operations as described above with relation to steps 210 and 310.

The MultiLane_Bag class includes an insert function that accepts an element v and inserts the element into the bag as described in method 200 FIG. 2. The function gets a unique insert operation identifier (long insertIdentifier) by invoking the getAndIncrement( ) function on the insert counter. The insert function then attempts to put the element into the blocking queue at the index of the queue array corresponding to the insert identifier modulo the array length (i.e., number of lanes).

The MultiLane_Bag class also includes a consume function that returns an element from the bag as described in method 300 of FIG. 3. The function gets a unique consume operation identifier (long consumeIdentifier) by invoking the getAndIncrement( ) function on the consume counter. The consume function then attempts to take an element from the blocking queue at the index of the queue array corresponding to the consume identifier modulo the array length (i.e., number of lines). If the blocking queue is empty, the queue may block the consumer by not returning from the take( ) function until an element to return is inserted into the queue.

The scheme described herein of using counters to control insert and consume access to the lanes ensures that a consume invocation will always return an element from the bag if the bag is non-empty. The multi-lane bag outperforms other implementations because it diffuses coherence traffic by distributing accesses across multiple lanes. Furthermore, the critical sections (i.e., atomic sections) of the insert and consume functions are so small. That is, they only atomic sections are the getAndIncrement( ) calls.

In some embodiments, the size of each queue may be bounded, such that the queue blocks producers that attempt to insert an element when the queue is already buffering a number of elements equal to the upper bound. In such embodiments, the boundedness property avoids excessive rate imbalance between producers and consumers, as to prevent runaway producers that could otherwise generate an undesirably large number of messages and thereby consume large amounts of resources.

As discussed above, there are various uses for the multi-lane bag, including inter-thread communications and resource pools. In some embodiments, the multi-lane bag may be used to construct a semaphore, where, the semaphore count represents the number of elements in the semaphore. Because a semaphore can be used to provide K-exclusion, it can be used to implement simple mutual exclusion (1-exclusion). That is, the bag can be used to implement efficient semaphores and locks.

For simplicity of explication the sample code above uses 64-bit AtomicLong counters for the insert and consume counters. Such counters will not roll over in the lifetime of most programs, and therefore the "index stream" generated by such counters is cyclic. However, in some embodiments, the index stream need not be strictly cyclic. Instead, in some embodiments, the bag may simply guarantee that the two counters simply follow the same trajectory. Accordingly, in some embodiments, using a 32-bit AtomicInteger rather than a 64-bit AtomicLong for the counters could be more efficient on some platforms. In such embodiments, the code to advance the read counter and compute the read target queue index might be: int Index=(consumeCounter.getAndIncrement( )&0xFFFFFF) % q.length.

In some embodiments, rather than using an array of queues (or other intermediaries), the multi-lane bag may store the queues according to another configuration, such as a circularly linked list of nodes, where each node contains a reference to a distinct intermediary and a pointer to the next node. In such embodiments, the insert and consume pointers could be references to nodes and advanced using an atomic compareAndSet operation rather than the atomic getAndIncrement( ) used in the sample embodiments above.

Figure 4:
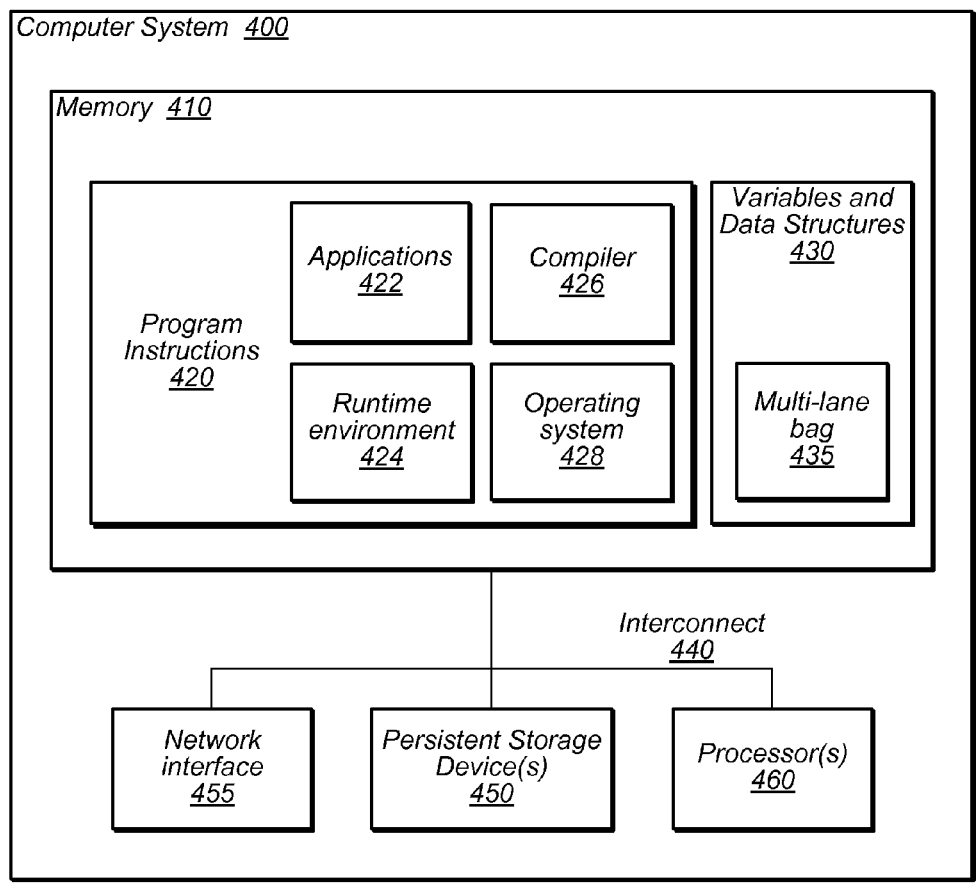
FIG. 4 is a block diagram illustrating a computer system configured to implement a multi-lane bag, according to various embodiments.

FIG. 4 is a block diagram illustrating a computer system configured to implement a multi-lane bag, according to various embodiments. The computer system 400 may correspond to any of various types of devices including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The code to execute various methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 400 includes various interconnected components. For example, system 400 includes one or more processors 460, each of which may include multiple cores, any of which may be single or multi-threaded. The computer system may include one or more persistent storage devices, such as 450, which may include optical storage, magnetic storage, hard drive, tape drive, and/or solid-state memory, etc. The system may also include a network interface, such as 445, which may facilitate communication with other computers across a network. The computer system may also include one or more memories, such as 410, which may be implemented as one or more of cache, SRAM, DRAM, RDRAM, EDO RAM, DDR RAM, SDRAM, Rambus RAM, EEPROM, etc. Various embodiments may include fewer or additional components not illustrated in FIG. 4 (e.g., video cards, audio cards, additional network interfaces, peripheral devices, a network interface such as an ATM interface, an Ethernet interface, a Frame Relay interface, monitors, keyboards, speakers, etc.).

According to the illustrated embodiment, the network interface 445, persistent storage device 450, one or more processors 460, and memory 410 may be interconnected via interconnect 440. Interconnect 440 may be implemented using various technologies. For example, interconnect 440 may correspond to one or more system buses and/or to one or more point-to-point interconnects in different topologies (e.g., grid, torus, etc.).

One or more of the system memories 410 may contain program instructions 420. Program instructions 420 may be encoded in platform native binary, any interpreted language such as Java™ byte-code, in any high-level programming language such as C/C++, Java™, etc., or in any combination thereof. Program instructions 420 may include instructions executable to implement various applications 422, runtime environments 424 (e.g., Java™ runtime and associated libraries), compilers 426, and/or operating systems 428.

In some embodiments, memory 410 may include any number of in-memory variables and/or data structures, such as 430. Variables and data structures may comprise any number of variables and/or data structures allocated by executing programs, such as by applications 422, server 428, compiler 426, and runtime environments 424.

Variables and data structures 430 may include one or more multi-lane bags, such as multi-lane bag 435, as described herein. Multi-lane bag 435 may correspond to multi-lane bag 105 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A non-transient, computer-readable storage medium storing program instruction executable by a processor to implement:
a concurrent multi-lane bag data structure comprising:
a plurality of independently-accessible concurrent intermediaries configured to store data elements;
an insert function executable to insert a given data element into the bag by selecting a successive one of the intermediaries, at least in part, by atomically reading and modifying an indication of the most recent intermediary selected by an execution of the insert function, and inserting the data element into the selected intermediary; and
a consume function executable to consume a data element from the bag by choosing a successive one of the intermediaries, at least in part, by atomically reading and modifying an indication of the most recent intermediary chosen by an execution of the consume function, and removing and returning the data element from the chosen intermediary;
wherein:
the bag guarantees that an execution of the consume function consumes a data element if the bag is non-empty; and
the bag enables multiple threads to execute the insert function or the consume function concurrently.

2. The medium of claim 1, wherein: the insert function is configured such that successive executions select successive intermediaries in a predefined order; and the consume function is configured such that successive executions choose successive intermediaries in the same predefined order.

3. The medium of claim 2, wherein the ordering is defined by respective positions of the intermediaries within an array.

4. The medium of claim 2, wherein the ordering is defined by respective positions of the intermediaries within a linked list.

5. The medium of claim 1, wherein one or more of the intermediaries is a concurrent blocking queue or a concurrent blocking bag.

6. The medium of claim 1, wherein the consume function is further executable to invoke a consume function of the chosen intermediary, wherein the consume function of the chosen intermediary is configured to block the executing thread if the intermediary stores no data element.

7. The medium of claim 1, wherein the program instructions are further executable to implement multi-thread communication comprising:
multiple producer threads configured to concurrently insert data elements into the bag; and
multiple consumer threads configured to concurrently consume the data elements from the bag.

8. The medium of claim 1, wherein the program instructions are further executable to use the bag to implement a resource pool or a semaphore.

9. A method, comprising:
providing, by a computer system, a multi-lane concurrent bag to a plurality of threads, wherein the bag comprises:
a plurality of independently-accessible concurrent intermediaries configured to store data elements;
an insert function executable to insert a given data element into the bag by selecting a successive one of the intermediaries, at least in part, by atomically reading and modifying an indication of the most recent intermediary selected by an execution of the insert function, and inserting the data element into the selected intermediary;
and a consume function executable to consume a data element from the bag by choosing a successive one of the intermediaries, at least in part, by atomically reading and modifying an indication of the most recent intermediary chosen by an execution of the consume function, and removing and returning the data element from the chosen intermediary;
wherein:
the bag guarantees that an execution of the consume function consumes a data element if the bag is non-empty; and
the bag enables multiple threads to execute the insert function or the consume function concurrently; and
executing, by the computer system, the plurality of concurrent threads, wherein the executing comprises:
the threads communicating with one another using the bag by inserting data elements into the bag by executing the insert function and consuming those data elements from the bag by executing the consume function.

10. The method of claim 9, wherein:
the insert function is configured such that successive executions select successive intermediaries in a predefined order; and the consume function is configured such that successive executions choose successive intermediaries in the same predefined order.

11. The method of claim 10, wherein the ordering is defined by respective positions of the intermediaries within an array or within a linked list.

12. The method of claim 9, wherein one or more of the intermediaries is a concurrent blocking queue or a concurrent blocking bag.

13. The method of claim 9, wherein executing the consume function, by at least one of the threads, comprises: determining that the chosen intermediary stores no data elements; and in response, blocking the thread executing the consume function until a data element is inserted into the chosen intermediary.

14. The medium of claim 9, wherein the threads communicate via the bag to implement a resource pool or a semaphore.

15. A system, comprising:
a processor;
a memory coupled to the processor and storing program instructions executable by the processor to implement a concurrent multi-lane bag data structure comprising:
a plurality of independently-accessible concurrent intermediaries configured to store data elements;
an insert function executable to insert a given data element into the bag by selecting a successive one of the intermediaries, at least in part, by atomically reading and modifying an indication of the most recent intermediary selected by an execution of the insert function, and inserting the data element into the selected intermediary, wherein the insert function is configured such that successive executions select successive intermediaries in a predefined order; and a consume function executable to consume a data element from the bag by choosing a successive one of the intermediaries, at least in part, by atomically reading and modifying an indication of the most recent intermediary chosen by an execution of the consume function, and removing and returning the data element from the chosen intermediary, wherein the consume function is configured such that successive executions choose successive intermediaries in the predefined order;

wherein:

the bag guarantees that an execution of the consume function consumes a data element if the bag is non-empty; and the bag enables multiple threads to execute the insert function or the consume function concurrently.

16. The system of claim 15, wherein the ordering is defined by respective positions of the intermediaries within an array or within a linked list.

17. The system of claim 15, wherein one or more of the intermediaries is a concurrent blocking queue or a concurrent blocking bag.

18. The system of claim 15, wherein the consume function is further executable to invoke a consume function of the chosen intermediary, wherein the consume function of the chosen intermediary is configured to block the executing thread if the intermediary stores no data element.

* * * * *

UNITED STATES PATENT AND TRADEMARK OFFICE
CERTIFICATE OF CORRECTION

PATENT NO.        : 8,689,237 B2
APPLICATION NO.   : 13/241015
DATED             : April 1, 2014
INVENTOR(S)       : Dice et al.

Page 1 of 1

It is certified that error appears in the above-identified patent and that said Letters Patent is hereby corrected as shown below:

In the Specification,

In column 6, lines 15-16, delete ""cursors" // that chase" and insert -- "cursors" that // chase --, therefor.

In column 7, line 46, delete "AtomicInteger" and insert -- Atomicinteger --, therefor.

In column 8, line 23, delete "etc.)" and insert -- etc.). --, therefor.

Signed and Sealed this
Thirtieth Day of June, 2015

Michelle K. Lee
*Director of the United States Patent and Trademark Office*